United States Patent
Robinson et al.

(10) Patent No.: US 11,590,441 B2
(45) Date of Patent: Feb. 28, 2023

(54) GAS FILTRATION APPARATUS

(71) Applicant: NORGREN LIMITED, Lichfield (GB)

(72) Inventors: James Robinson, Lichfield (GB);
Steven Gardner, Lichfield (GB);
Jagroop Singh Sahota, Lichfield (GB)

(73) Assignee: NORGREN LIMITED

( * ) Notice: Subject to any disclaimer, the term of this patent is extended or adjusted under 35 U.S.C. 154(b) by 117 days.

(21) Appl. No.: 16/607,639

(22) PCT Filed: Apr. 25, 2018

(86) PCT No.: PCT/GB2018/051085
§ 371 (c)(1),
(2) Date: Oct. 23, 2019

(87) PCT Pub. No.: WO2018/197871
PCT Pub. Date: Nov. 1, 2018

(65) Prior Publication Data
US 2020/0298159 A1 Sep. 24, 2020

(30) Foreign Application Priority Data

Apr. 25, 2017 (GB) .................................. 1706568

(51) Int. Cl.
| | |
|---|---|
| *B01D 46/00* | (2022.01) |
| *B01D 46/24* | (2006.01) |
| *B01D 46/10* | (2006.01) |
| *B01D 46/42* | (2006.01) |

(52) U.S. Cl.
CPC ...... *B01D 46/0005* (2013.01); *B01D 46/2411* (2013.01); *B01D 46/10* (2013.01); *B01D 46/4227* (2013.01); *B01D 2265/028* (2013.01); *B01D 2271/027* (2013.01)

(58) Field of Classification Search
CPC ............ B01D 46/0005; B01D 46/2411; B01D 46/2414; B01D 46/10; B01D 46/4227; B01D 2265/028; B01D 2271/027; B01D 2201/301; B01D 2201/302; B01D 2201/304; B01D 2201/305
See application file for complete search history.

(56) References Cited

U.S. PATENT DOCUMENTS

| 4,735,288 A | 4/1988 | Uematsu et al. | |
|---|---|---|---|
| 2014/0083299 A1* | 3/2014 | Yamase ................ | B01D 46/24 96/416 |

(Continued)

FOREIGN PATENT DOCUMENTS

WO WO2012153430 A1 11/2012

OTHER PUBLICATIONS

International Search Report and Written Opinion from PCT Application No. PCT/GB2018/051085 dated Jun. 29, 2018, pp. 1-12.

*Primary Examiner* — Robert Clemente
(74) *Attorney, Agent, or Firm* — The Belles Group, P.C.

(57) ABSTRACT

A filter apparatus for filtering a stream of gas. The cartridge has an upper part and a lower part. The upper part is joined to the lower part by a connection. The filter cartridge supports a filter element. The filter cartridge has a resilient connection arrangement for connecting the filter cartridge to a bowl of a filter apparatus. The filter apparatus has a head, a bowl connectable to and sealable relative to said head, and the filter cartridge.

17 Claims, 5 Drawing Sheets

(56) References Cited

U.S. PATENT DOCUMENTS

| | | | |
|---|---|---|---|
| 2014/0124054 A1* | 5/2014 | Yamase | B01D 36/006 |
| | | | 137/375 |
| 2015/0090653 A1* | 4/2015 | Kotale | B01D 35/30 |
| | | | 210/236 |
| 2016/0288042 A1 | 10/2016 | Billiet | |
| 2017/0014746 A1* | 1/2017 | Smith | B01D 46/0005 |
| 2017/0072357 A1 | 3/2017 | Yamauchi | |

* cited by examiner

SECTION C-C (1:1)

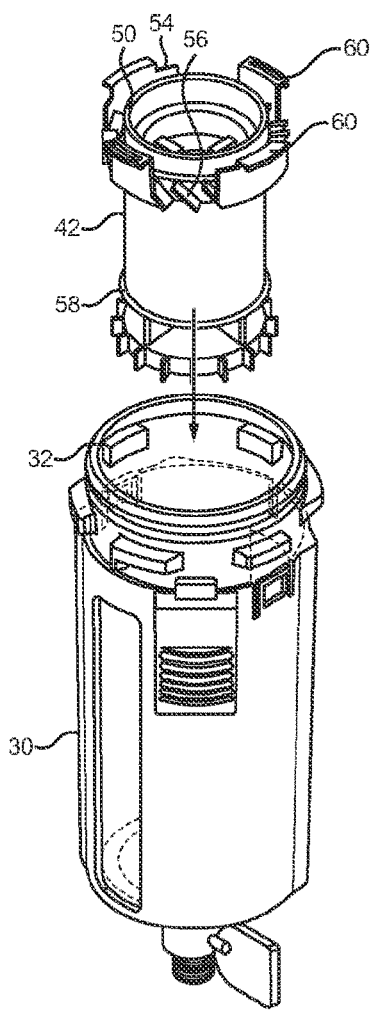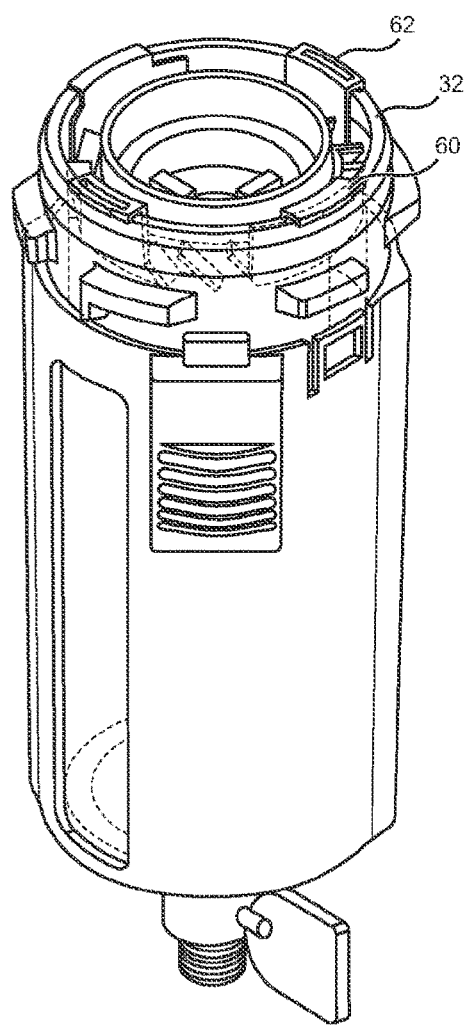
FIG. 5　　　　　　FIG. 6
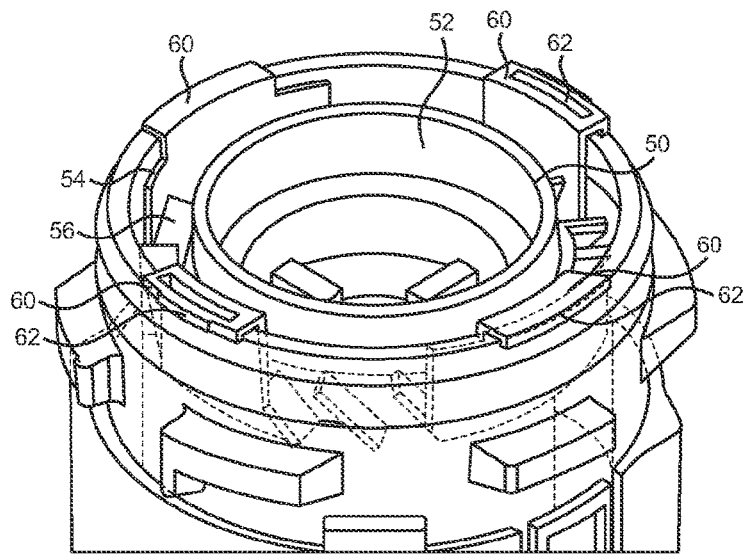
FIG. 7

GAS FILTRATION APPARATUS

CROSS-REFERENCE TO RELATED PATENT APPLICATIONS

The present application is a U.S. national stage application under 35 U.S.C. § 371 of PCT Application No. PCT/GB2018/051085, filed Apr. 25, 2018, which claims priority to Great Britain Patent Application No. 1706568.1, filed Apr. 25, 2017. The disclosures of the aforementioned priority applications are incorporated herein by reference in their entireties.

FIELD OF THE INVENTION

The present invention relates to a filter apparatus for filtering gas, and in particular to an apparatus for filtering compressed air.

BACKGROUND TO THE INVENTION

Compressed air has a variety of uses in industry. Compressed air delivered directly from a compressor often contains impurities making it unsuitable for most applications which require a degree of purity of the air. Filtration can be used to remedy this, by removing impurities from the air.

One known filtration apparatus is installed downstream of a compressor, so that a stream of gas passing through the filter is treated before being directed to its end use. Such a filter includes a filter head having an inlet and an outlet, and a bowl which threadingly engages the head to form a sealed vessel, within which a filter member is contained. The filter member can take the form of a tube sealed at one end, which is attached to the filter head and sits within the bowl. Air is directed through the filter head, to and from the filter member. A first conduit directs the air from the inlet into the centre of the filter. The air flows through the tubular wall of the filter, up the sides of the filter bowl and then through a second conduit, which surrounds the first conduit, directing the air to the outlet. In this example the air is flowing from the inside of the filter to the outside but this flow can be reversed so that the air flows from the outside of the filter to the inside.

The filter operates by trapping particles and aggregates, removing them from the fluid flow. Over time, the filter can accumulate particles and become less effective, requiring maintenance or replacement. In the known arrangement outlined above, this is done by unscrewing the bowl from the head so as to expose the filter (which is attached to the head) which can then be disengaged from the filter head and replaced. In this arrangement the bowl can only be removed by moving the bowl completely away from the filter. A space at least as long as the bowl in the direction of the filter must therefore be available to move the bowl into for this operation to be possible. Consequently, in confined spaces the removal of the filter bowl can be extremely difficult and sufficient space must be left around the filter apparatus to allow the maintenance to take place. This additional space can present design limitations on the use of this type of filter in certain situations. Additionally, when a filter is being replaced it is often coated with a layer of oil making the used filter difficult to handle.

When alternate filtration apparatus are provided, such as filter-regulator or filter-lubricator devices, interlocking parts are often designed with mis-matching components to prevent the use of, for example, a filter bowl with a filter-regulator head. However, this mis-matching of components does not prevent replacement bowls or filters being ordered incorrectly in the first place, and thus will exacerbate the length of time the filtration apparatus is unavailable due to maintenance.

There is therefore a need for improvements in gas filtration devices.

SUMMARY OF THE INVENTION

According to an aspect of the invention, there is provided a filter apparatus for filtering a stream of gas, the apparatus comprising: a head having an inlet and an outlet, the head including a first flow conduit connected to one of said inlet and said outlet and a second flow conduit connected to the other of said inlet and said outlet; a filter for filtering the gas flowing through the filter apparatus; a bowl connectable to and sealable relative to said head for containing said filter, said bowl having an opening defined by a rim; a filter cartridge for supporting said filter, the filter cartridge comprising: an upper part and a lower part; a filter element, for filtering the gas flowing through the filter apparatus; wherein the upper part is joined to the lower part by a connection so as to support the filter element; and wherein the filter cartridge defines a resilient connection arrangement for connecting the filter cartridge to a bowl of a filter apparatus.

By arranging the attachment features on the filter cartridge, the design of the bowl and the rim of the bowl may be kept simple, so that the design of the bowl may applied to both a polymer and a die-cast design. Furthermore, the same bowl and cartridge design may be used with different types of filtration apparatus, for example both filter apparatus and filter-regulator apparatus.

The upper part may have an inner rim which defines an annular surface. The upper part may have an outer rim which is connected to the inner rim by a plurality of radially extending vanes.

The outer rim may have a plurality of clips. The plurality of clips may be equally distributed about the circumference of the outer rim.

At least one of the plurality of clips includes a flange which resiliently engages the rim of the bowl.

Two of the plurality of clips may include a flange which resiliently engages the rim of the bowl. These arrangements prevent the cartridge from being held by the head when the bowl is removed due to stiction between the seal between the cartridge and the head.

The bowl may include a plurality of attachment lugs at an upper end thereof.

The plurality of attachment lugs may be equally distributed about the circumference of the upper end of the bowl.

At least one of the plurality of attachment lugs may have an axial extension to provide orientation control when attaching the bowl to the head.

An O-ring seal may be provided on the bowl, adjacent said rim.

The O-ring seal may be provided in a recess on an outer surface of the bowl.

The first fluid conduit may be defined, at least in part, by a chimney.

The chimney may have an outer surface, wherein a recess is provided on the outer surface.

An O-ring seal may be provided in the recess on the outer surface of the chimney.

BRIEF DESCRIPTION OF THE DRAWINGS

Embodiments of the present invention will now be described, by non-limiting example only, with reference to the accompanying drawings, in which:

FIG. 5 is an isometric view of a filter cartridge being inserted into the bowl of a filtration apparatus;

FIG. 6 is an isometric view of the filter cartridge of FIG. 5 located in the bowl of the filtration apparatus of FIG. 5; and FIG. 7 is an enlarged view of the filter cartridge located in the bowl of the filtration apparatus of FIG. 6.

DESCRIPTION OF EMBODIMENTS OF THE INVENTION

Figure 1:
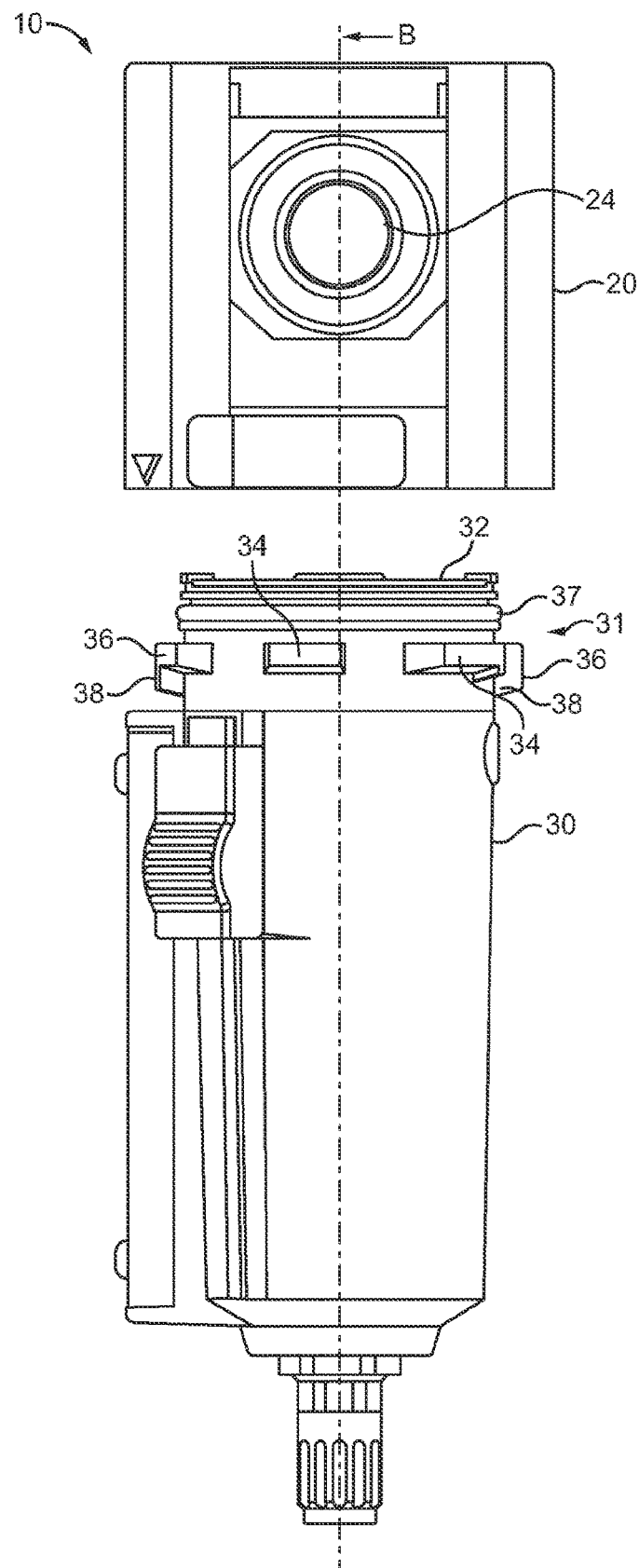
FIG. 1 is an exploded schematic of a filtration apparatus.
Figure 2:
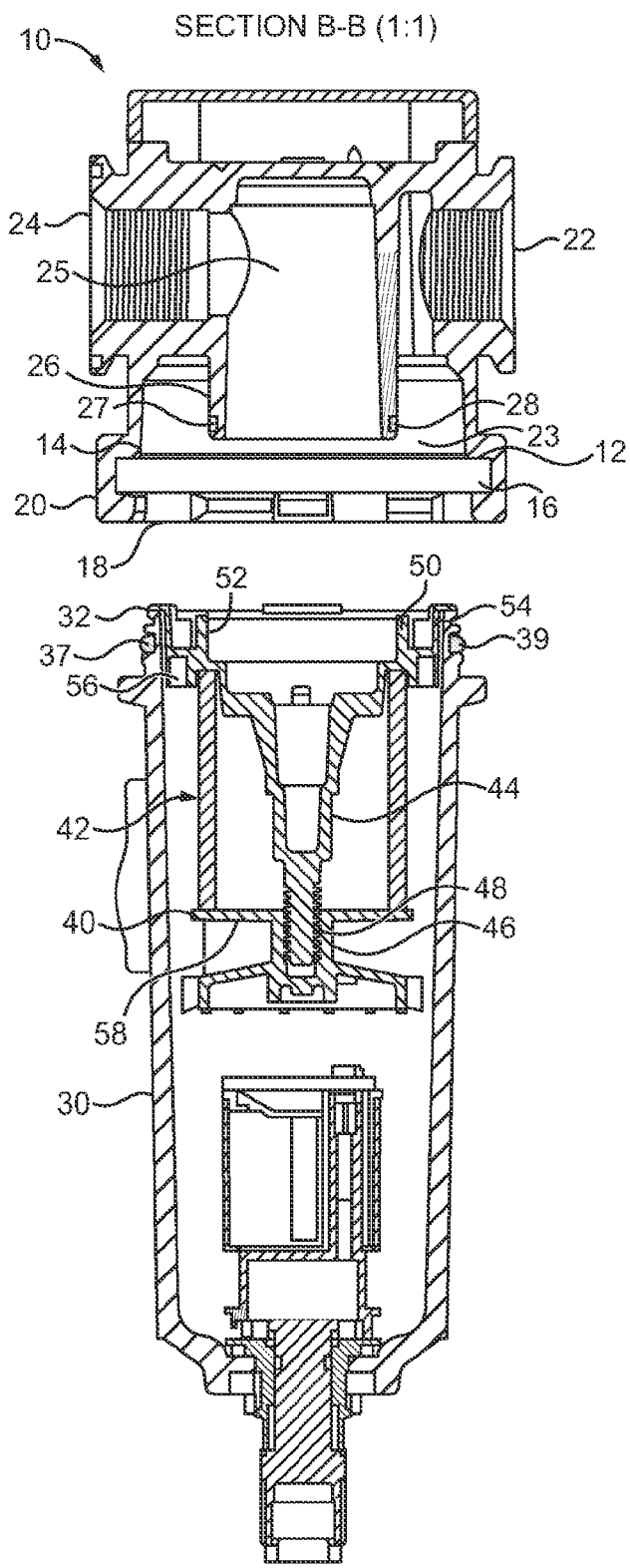
FIG. 2 is a cross-section taken at line B-B of FIG. 1.

Referring to FIGS. 1 and 2, a filtration apparatus 10 has a filter head 20, a bowl 30 and a filter cartridge 40.

The bowl 30 engages the head 20 to form a sealed vessel, within which the filter cartridge 40 is contained. The filter cartridge 40 takes the form of a tube sealed at one end, which is attached to the filter head 20 and sits within the bowl 30.

The filter head 20 has an inlet 22, an outlet 24 and an opening 18. The inlet 22 is fluidly connected to the opening 18 via an annular inlet chamber 23. The outlet 24 is fluidly connected to the opening 18 via a cylindrical outlet chamber 25. The annular inlet chamber 23 is separated from the cylindrical outlet chamber 25 by a chimney 26.

The inlet chamber 23 is bounded by an inner surface 12 of the head 20. The inner surface 12 includes a seal abutment region 14 and an annular lug recess 16. Two recess extensions (not shown) extend axially from the annular lug recess 16 to the opening 18. An O-ring seal 27 is provided in a recess 28 on an outer surface on the chimney 26.

The bowl 30 is open at an upper end 31 thereof, where a rim 32 is provided. Attachment lugs 34, 36 are provided adjacent the upper end 31. The attachment lugs 34, 36 are equally distributed about the circumference of the upper end 31 of the bowl 30. Two of the attachment lugs 36 are provided with axial extensions 38 to provide orientation control when attaching the bowl 30 to the head 20 as will be described in more detail below. Between the attachment lugs 36 and upper end 31 there is provided an O-ring seal 37 which sits in a recess 39 on an outer surface of the bowl 30.

The filter cartridge 40 comprises an upper part 44 and a lower part 46. The upper part 44 defines a connection arrangement for connecting the filter cartridge 40 to the bowl 30 as will be described in more detail below. The upper part 44 is joined to the lower part 46 by a screw connection 48. Together, the upper part 44 and lower part 46 act as a carrier for the filter element 42. In an alternate embodiment (not shown) the upper part 44 is joined to the lower part 46 by a snap fit connection.

The upper part 44 has an inner rim 50 which defines an annular surface 52. The upper part has an outer rim 54 which is connected to the inner rim 50 by a plurality of radially extending vanes 56. Unlike the inner rim 50 the outer rim 54 is not circumferentially continuous. The outer rim 54 has four clips 60. The four clips 60 are equally distributed about the circumference of the outer rim 54. Two of the four clips 60 include a flange 62 which resiliently engages the bowl rim 32 with a snap fit. Two of the four clips 60 simply have a plane surface to provide axial support of the filter cartridge 40 on the bowl rim 32. The upper part 44 has a lower profiled surface which defines a recess to review the filter element 42.

The lower part 46 has a sealing plate 58 to seal the tube formed by the filter element 42.

The cartridge 40 is assembled as follows:

An upper end of the filter element 42 is located within lower profiled surface of the upper part 44 of the filter cartridge 40. The lower part 46 is screwed onto the upper part 44 using the screw connection 48. As the lower part 46 and upper part 44 are screwed together, the filter element 42 is sandwiched between the sealing plate 58 of the lower part 46 and the lower profiled surface of the upper part 44 such that the filter element 42 is resiliently held in place.

Referring to FIGS. 5 to 7, the filtration apparatus 10 is assembled as follows:

The assembled cartridge 40 is axially aligned with, and lowered into the bowl 30 (FIG. 5). Rotational orientation of the assembled cartridge 40 relative to the bowl 30 is not constrained due to the continuous nature of the bowl rim 32. The two flanges 62 of the four clips 60 resiliently engage the bowl rim 32 to fix the cartridge in place within the bowl 30. The two plane surface flanges rest upon the bowl rim 32 to axially support the filter cartridge 40 on the bowl rim 32.

The bowl and cartridge assembly are axially aligned with, and brought together with the head 20. As two of the attachment lugs 36 of the bowl 30 are provided with axial extensions 38 rotational orientation of the bowl relative to the head 20 is required. The attachment lugs 36 with axial extensions 38 are aligned with the recess extensions (not shown) extending axially from the annular lug recess 16 to the opening 18. The bowl and cartridge assembly is inserted into the opening 18 of the head 20 until the attachment lugs 34, 36 are resiliently located into the annular lug recess 16.

With the bowl and cartridge assembly located within the head 20, the O-ring seal 37 of the bowl seals against the seal abutment region 14 of the inner surface 12 of the head and the O-ring seal 27 of the chimney 26 seals against the annular surface 52 of the inner rim 50 of the cartridge 40.

The resilient engagement of the filter cartridge 40 to the bowl 30 via the two flanges 62 prevents the filter cartridge 40 from being retained by the filter head 40 via the stiction between the O-ring seal 27 on the chimney 26 and the annular surface 52 of the cartridge 40. Therefore, optimal clearance is achieved when removing the bowl 30 and filter cartridge 40 together, and subsequent maintenance or replacement of the filter cartridge 40 is facilitated.

Airflow through the filtration apparatus 10 is as follows:

Air is directed through the filter head 20, to and from the filter cartridge 40. Air flows through the inlet 22 of the head 20 and is directed down through the annular inlet chamber 23 and out of the opening 18 of the head 20. From the head 20 air is directed down the outside of the cartridge 40 between the outer rim 54 and the inner rim 50. Swirl is imparted onto the airflow by the plurality of radially extending vanes 56 between the outer rim 54 and the inner rim 50. Air passes through the filter element 42 and up through the inside of the cartridge 40, through the opening 18 of the head 20. The filtered air exits the head 20 via the outlet 24 after passing through the cylindrical outlet chamber 25. In this example the air is flowing from the outside of the filter cartridge 40 to the inside, but this flow can be reversed so that the air flows from the inside of the filter cartridge 40 to the outside.

Figure 3:
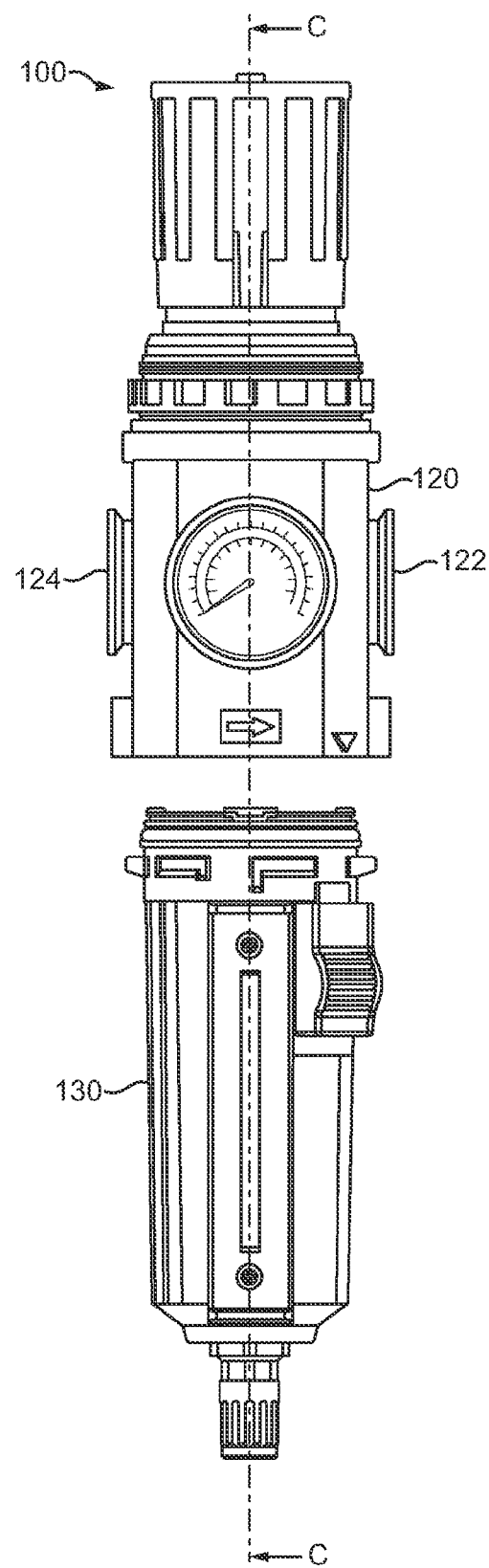
FIG. 3 is an exploded schematic of a filer-regulator-lubricator apparatus.
Figure 4:
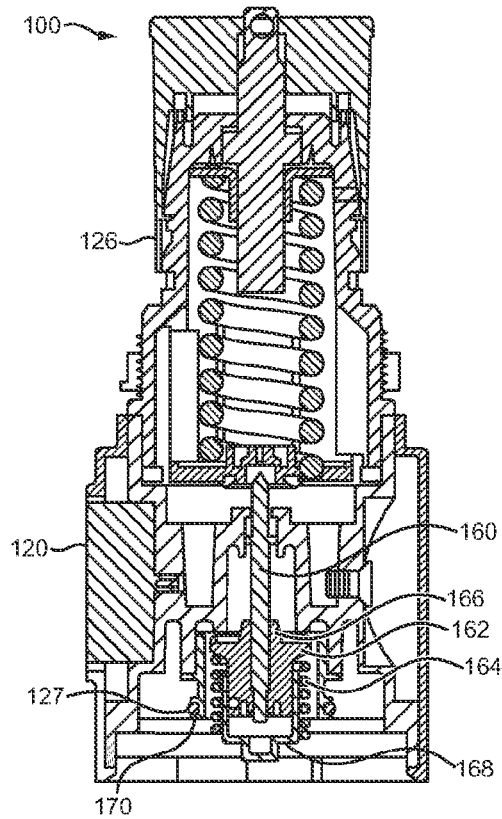
FIG. 4 is a cross-section taken at line C-C of FIG. 3.
Figure 4:
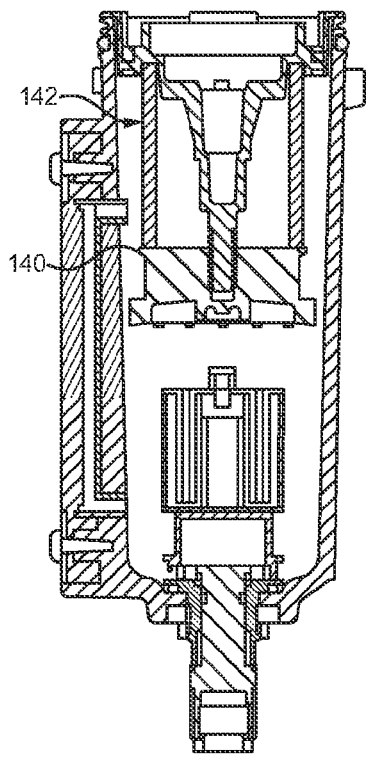

Referring to FIGS. 3 and 4, a filtration apparatus 100 is shown. The filtration apparatus 100 is a filter-regulator (FR). Like the filtration apparatus 10 of FIGS. 1 and 2, the filtration apparatus 100 has a filter head 120, a bowl 130 and a filter cartridge 140. The filtration apparatus 100 of FIGS.

3 and 4 is similar in many ways to the filtration apparatus 10 of FIGS. 1 and 2, such that only the substantial difference shall be described in detail.

The filtration apparatus 100 has a head 120, a bowl 130 and a filter cartridge 140. The interface dimensions of the filter apparatus 100 are identical to the interface dimensions of the filtration apparatus 10 such that a generic bowl 30, 130 and a filter cartridge 40, 140 may be used with either apparatus 10, 100.

In addition to filtration of the air flow, the filtration apparatus 100 additionally regulates the air flow. Regulation is performed by regulator assembly 126 in a manner that is known in the art.

Importantly, the filter cartridge 140 is identical to the filter cartridge 40 used with filtration apparatus 10.

The regulator assembly 126 includes a valve pin 160 which is retained in the head 120. The valve pin 160 acts upon a valve body 162 to seal against valve seat 166. This seal is biased closed by valve spring 164, which acts against the valve body 162 via the valve retainer 168. As the valve pin 160 and associated elements are fully retained within the head 120, assembly and disassembly of the bowl 130 and filter cartridge 140 to the head 120 is exactly the same as for the filtration apparatus 10 of FIGS. 1 and 2. Furthermore, during maintenance, there is no risk that the valve pin 160 is lost or replaced in the incorrect orientation.

An O-ring seal 127 is provided in a recess 170 on an outer surface on the valve retainer 168. This arrangement replicated the arranged with respect to the chimney 26 on filter head 20, with respect to filtration apparatus 10. This ensures that the bowl and cartridge arrangement may be used interchangeably with either apparatus 10, 100.

The following detailed description and figures provide examples of how the present invention can be implemented and should not be seen as limiting examples, rather illustrations of how the various features of the filter cartridge 40 can be used. Other optional variations will be evident upon a reading of the following description in light of the figures.

The invention claimed is:

1. A filter apparatus for filtering a stream of gas, the apparatus comprising:
a head having an inlet and an outlet, the head including a first flow conduit connected to one of said inlet and said outlet and a second flow conduit connected to the other of said inlet and said outlet, wherein the first fluid conduit is defined, at least in part, by a chimney, wherein the chimney has an outer surface, wherein an annular recess is provided on the outer surface to retain an O-ring seal therein, wherein the O-ring seal is provided in the annular recess on the outer surface of the chimney;
a filter for filtering the gas flowing through the filter apparatus, the filter comprising:
a bowl connectable to and sealable relative to said head for containing said filter, said bowl having an opening defined by a rim;
a filter cartridge for supporting said filter, the filter cartridge comprising:
an upper part and a lower part;
a filter element, for filtering the gas flowing through the filter apparatus; wherein the upper part is joined to the lower part by a connection so as to support the filter element; and
wherein the upper part has an inner rim which defines an annular surface,
wherein the upper part has an outer rim which is connected to the inner rim by a plurality of radially extending vanes,
wherein the outer rim has a plurality of clips, two of the plurality of clips including a flange which resiliently engages the rim of the bowl, with a snap-fit so as to prevent the filter cartridge from being retained by the filter head via the stiction between the O-ring seal on the chimney and the cartridge during disassembly of the bowl from the head,
wherein the filter apparatus is a filter-regulator,
wherein the head further includes a regulator assembly, and
where the regulator assembly includes a valve pin which is retained in the head when the bowl is disassembled from the head.

2. A filter apparatus according to claim 1, wherein the plurality of clips are equally distributed about the circumference of the outer rim.

3. A filter apparatus according to claim 1, wherein said bowl includes a plurality of attachment lugs at an upper end thereof.

4. A filter apparatus according to claim 3, wherein the plurality of attachment lugs are equally distributed about the circumference of the upper end of the bowl.

5. A filter apparatus according to claim 3, wherein at least one of the plurality of attachment lugs has an axial extension to provide orientation control when attaching the bowl to the head.

6. A filter apparatus according to claim 1, wherein an O-ring seal is provided on the bowl, adjacent said rim.

7. A filter apparatus according to claim 6, wherein the O-ring seal is provided in an annular recess on an outer surface of the bowl.

8. An air preparation kit comprising:
at least one filter apparatus and at least one regulator assembly, wherein the at least one filter apparatus and the at least one regulator assembly each comprise:
a head having an inlet and an outlet, the head including a first flow conduit connected to one of said inlet and said outlet and a second flow conduit connected to the other of said inlet and said outlet, wherein the first fluid conduit is defined, at least in part, by a chimney, wherein the chimney has an outer surface, wherein an annular recess is provided on the outer surface to retain an O-ring seal therein, wherein the O-ring seal is provided in the annular recess on the outer surface of the chimney;
a filter for filtering the gas flowing through the filter apparatus;
a bowl connectable to and sealable relative to said head for containing said filter, said bowl having an opening defined by a rim;
a filter cartridge for supporting said filter, the filter cartridge comprising:
an upper part and a lower part;
a filter element, for filtering the gas flowing through the filter apparatus; wherein the upper part is joined to the lower part by a connection so as to support the filter element;
wherein the upper part has an inner rim which defines an annular surface, the upper part has an outer rim which is connected to the inner rim by a plurality of radially extending vanes, the outer rim has a plurality of clips, wherein two of the plurality of clips includes a flange which resiliently engages the rim of the bowl, with a snap-fit so as to prevent the filter cartridge from being retained by the filter head via the stiction between the O-ring seal on the chimney and the cartridge during disassembly of the bowl from the head;

wherein the head of the at least one filter apparatus and the head of the at least one regulator assembly both have an identical interface dimension such that a generic bowl and generic filter cartridge may be used with either apparatus, wherein the filter apparatus is a filter-regulator, wherein the head further includes a regulator assembly, and where the regulator assembly includes a valve pin which is retained in the head when the bowl is disassembled from the head.

9. An air preparation kit according to claim 8, wherein the plurality of clips are equally distributed about the circumference of the outer rim.

10. An air preparation kit according to claim 8, wherein said bowl includes a plurality of attachment lugs at an upper end thereof.

11. An air preparation kit according to claim 10, wherein the plurality of attachment lugs are equally distributed about the circumference of the upper end of the bowl.

12. An air preparation kit according to claim 10, wherein at least one of the plurality of attachment lugs has an axial extension to provide orientation control when attaching the bowl to the head.

13. An air preparation kit according to claim 8, wherein an O-ring seal is provided on the bowl, adjacent said rim, and wherein the O-ring seal is provided in an annular recess on an outer surface of the bowl.

14. A filter apparatus for filtering a stream of gas, the apparatus comprising:

a head having an inlet and an outlet, the head including a first flow conduit connected to one of said inlet and said outlet and a second flow conduit connected to the other of said inlet and said outlet, wherein the first fluid conduit is defined, at least in part, by a chimney, wherein the chimney has an outer surface, wherein an annular recess is provided on the outer surface to retain an O-ring seal therein, wherein the O-ring seal is provided in the annular recess on the outer surface of the chimney;

a filter for filtering the gas flowing through the filter apparatus, the filter comprising:

a bowl connectable to and sealable relative to said head for containing said filter, said bowl having an opening defined by a rim;

a filter cartridge for supporting said filter, the filter cartridge comprising:

an upper part and a lower part; and a filter element, for filtering the gas flowing through the filter apparatus, wherein the upper part is joined to the lower part by a connection so as to support the filter element, wherein the upper part has an inner rim which defines an annular surface, wherein the upper part has an outer rim which is connected to the inner rim by a plurality of radially extending vanes, wherein the outer rim has a plurality of clips, two of the plurality of clips including a flange which resiliently engages the rim of the bowl, with a snap-fit so as to prevent the filter cartridge from being retained by the filter head via the stiction between the O-ring seal on the chimney and the cartridge during disassembly of the bowl from the head, wherein the filter apparatus is a filter-regulator, wherein the head further includes a regulator assembly, wherein the regulator assembly includes a valve pin, a valve body, a valve seat, a valve spring and a valve retainer, and wherein the valve pin acts upon the valve body to seal against valve seat, wherein a valve seal is biased closed by the valve spring, and wherein the valve pin, valve body, valve seat, valve spring and valve retainer are fully retained within the head when the bowl is disassembled from the head.

15. A filter apparatus according to claim 14, wherein the plurality of clips are equally distributed about the circumference of the outer rim, wherein said bowl includes a plurality of attachment lugs at an upper end thereof, wherein the plurality of attachment lugs are equally distributed about the circumference of the upper end of the bowl, wherein at least one of the plurality of attachment lugs has an axial extension to provide orientation control when attaching the bowl to the head, wherein an O-ring seal is provided on the bowl, adjacent said rim, and wherein the O-ring seal is provided in an annular recess on an outer surface of the bowl.

16. An air preparation kit comprising:

at least one filter apparatus and at least one regulator assembly, wherein the at least one filter apparatus and the at least one regulator assembly each comprise:

a head having an inlet and an outlet, the head including a first flow conduit connected to one of said inlet and said outlet and a second flow conduit connected to the other of said inlet and said outlet, wherein the first fluid conduit is defined, at least in part, by a chimney, wherein the chimney has an outer surface, wherein an annular recess is provided on the outer surface to retain an O-ring seal therein, wherein the O-ring seal is provided in the annular recess on the outer surface of the chimney;

a filter for filtering the gas flowing through the filter apparatus;

a bowl connectable to and sealable relative to said head for containing said filter, said bowl having an opening defined by a rim;

a filter cartridge for supporting said filter, the filter cartridge comprising: an upper part and a lower part; and a filter element, for filtering the gas flowing through the filter apparatus, wherein the upper part is joined to the lower part by a connection so as to support the filter element, wherein the upper part has an inner rim which defines an annular surface, the upper part has an outer rim which is connected to the inner rim by a plurality of radially extending vanes, the outer rim has a plurality of clips, wherein two of the plurality of clips includes a flange which resiliently engages the rim of the bowl, with a snap-fit so as to prevent the filter cartridge from being retained by the filter head via the stiction between the O-ring seal on the chimney and the cartridge during disassembly of the bowl from the head, wherein the head of the at least one filter apparatus and the head of the at least one regulator assembly both have an identical interface dimension such that a generic bowl and generic filter cartridge may be used with either apparatus, wherein the filter apparatus is a filter-regulator, wherein the head further includes a regulator assembly, wherein the regulator assembly includes a valve pin, a valve body, a valve seat, a valve spring and a valve retainer, wherein the valve pin acts upon the valve body to seal against valve seat, wherein a valve seal is biased closed by the valve spring, and wherein the valve pin, valve body, valve seat, valve spring and valve retainer are fully retained within the head when the bowl is disassembled from the head.

17. A air preparation kit according to claim 16, wherein the plurality of clips are equally distributed about the circumference of the outer rim, wherein said bowl includes a plurality of attachment lugs at an upper end thereof, wherein the plurality of attachment lugs are equally distributed about the circumference of the upper end of the bowl, wherein at least one of the plurality of attachment lugs has an axial extension to provide orientation control when attaching the bowl to the head, wherein an O-ring seal is provided on the bowl, adjacent said rim, and wherein the O-ring seal is provided in an annular recess on an outer surface of the bowl.

* * * * *